J. K. STEWART.
MAGNETIC SPEED INDICATOR.
APPLICATION FILED AUG. 18, 1911.
1,057,681.
Patented Apr. 1, 1913.
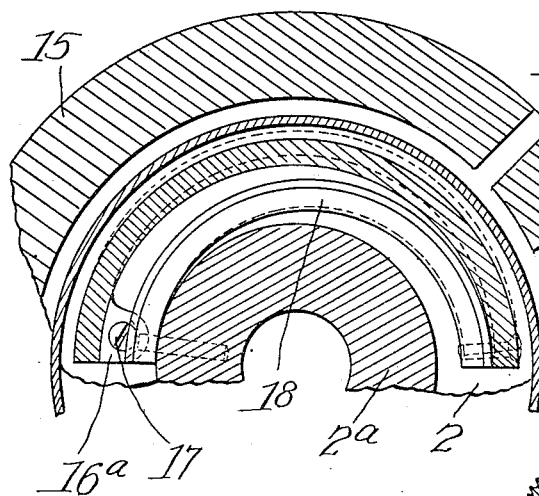
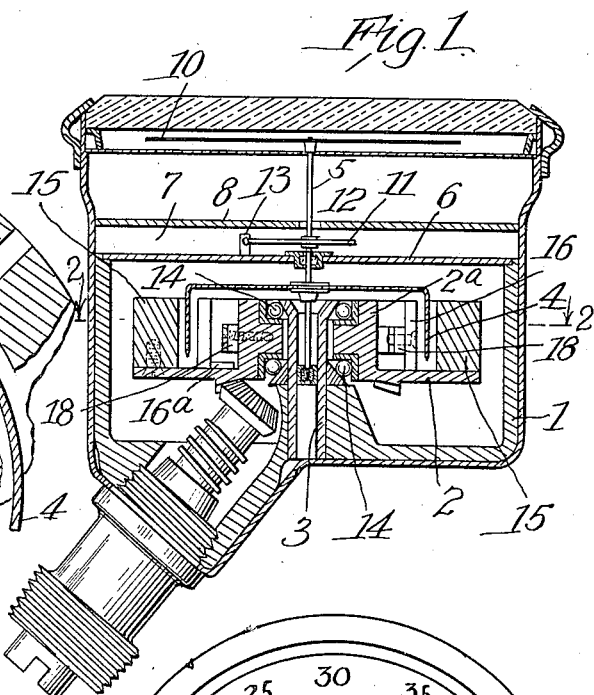
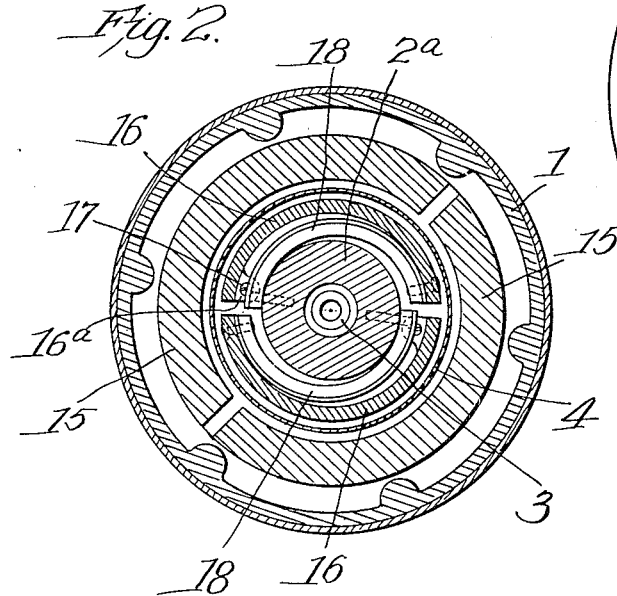
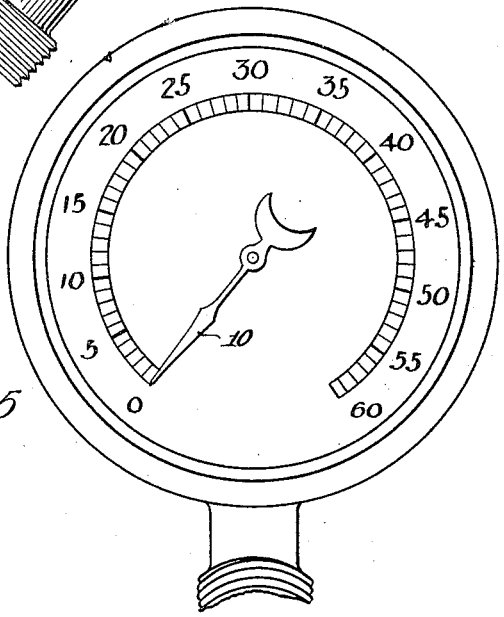
Witnesses:
P. J. Gathmann
Lucy T. Stone.
Inventor:
John K. Stewart.
By Burton & Burton
His Attorneys.

UNITED STATES PATENT OFFICE.

JOHN K. STEWART, OF CHICAGO, ILLINOIS, ASSIGNOR TO STEWART-WARNER SPEEDOMETER CORPORATION, OF THE STATE OF VIRGINIA.

MAGNETIC SPEED-INDICATOR.

1,057,681.  Specification of Letters Patent.  Patented Apr. 1, 1913.

Application filed August 18, 1911. Serial No. 644,731.

*To all whom it may concern:*

Be it known that I, JOHN K. STEWART, a citizen of the United States, residing at Chicago, in the county of Cook and State of Illinois, have invented new and useful Improvements in Magnetic Speed-Indicators, of which the following is a specification, reference being had to the accompanying drawings, forming a part thereof.

The purpose of this invention is to provide an improved construction of magnetic speed indicating instrument of greater sensitiveness than those commonly heretofore constructed, and having also means for automatically compensating error due to temperature changes.

It consists of the features and elements shown and described as indicated in the claims.

In the drawings: Figure 1 is an axial section of an instrument embodying this invention. Fig. 2 is a partly sectional front elevation, the section being made at the line, 2,—2, on Fig. 1. Fig. 3 is an enlarged detail view of the automatic compensating device and the parts affected thereby. Fig. 4 is a face view of the instrument.

The instrument shown in the drawings comprises a case, 1, in the form of a cup, and hereinafter referred to as the cup, a rotating magnet carrier, 2, on which are mounted magnets as hereinafter described, said carrier being journaled for rotation upon a post, 3, rigid with the bottom or back of the cup at the center thereof, and a biased drag element, 4, which is in the form of an inverted cup made of metal of low electrical resistance, as aluminum or copper, the former being preferable on account of its lightness, said drag element being mounted on a spindle, 5, which is stepped on the post on which the magnet carrier is mounted for rotation, and having an additional bearing in a plate, 6, closes the cavity of the cup in which the rotary magnet and biased drag are contained. The spindle, 5, extends above the said plate, 6, and also through a chamber, 7, which it is convenient to provide above said plate for containing an odometer train, not shown, and thence through a dial plate, 8, which closes said chamber, 7, and forms the visible face of the instrument, having upon it a scale graduated for whatever sort of indication is desired, the instrument shown being specifically designed for indicating speed of travel of a vehicle to which the instrument may be attached, the graduation is in terms of miles travel per hour, an index hand, 10, carried by the spindle traverses the graduated scale. A biasing spring, 11, attached at one end to the spindle by a collet, 12, and at the other end to a post, 13, projecting from the under side of the plate, 6, adjusted for holding the index hand normally at the zero point of the scale when the spring is free from tension. For convenience the entire cup and contents,—the parts mentioned,—are preferably inclosed in a metal shell, 22, having a glass face plate, 23, which covers and protects the dial and index hand.

The magnet carrier, 2, is made of non-magnetic metal and comprises a hub, 2ª, by means of which it is mounted with ball-bearings, 14—14, on the post, 3. Concentric with the bearings, there are mounted rigidly upon the carrier, 2, two magnets, 15,—15, each in the form of a half annulus, or split hollow cylinder, each, however, being slightly less than the entire form of a semi-cylinder, so that when mounted coaxially with the carrier, the opposed ends of the two magnets are slightly spaced apart. They are positioned with their poles of opposite name, respectively, facing each other, and slightly spaced apart as stated. The attachment of these magnets to the carrier is rigid so that they revolve therewith.

Positioned within the magnets, 15,—15, are two other approximately semi-cylindrical magnets, 16,—16, substantially co-axial with the outer magnets and the carrier, and spaced very slightly from the outer magnets, 15, so as to leave a narrow annular space between them, into which the inverted cup, or biased drag element, 4, depends and is adapted to oscillate about the axis without contact with the magnets of either side.

The two magnets, 16,—16, are preferably positioned with their poles about 45° out of line with poles of the outer magnets, 15—15. This position is found by experiment to produce greater drag upon the biased element than any other position. The inner magnets are mounted or formed so that their poles, or part of them, can be slightly moved toward and from the outer magnets. This is most conveniently accomplished by mounting each of the magnets, 16, upon the carrier pivotally at one of its poles, so that the other pole may be swung slightly to move the said other pole toward and from the outer magnet. For this purpose, as well as to give the magnets a broad base of support upon the carrier, they are preferably formed, each with an interiorly projecting flange, 16ª, and a pivotal attachment of the magnet to the carrier is made by means of a screw, 17, set through this flange near one pole of the magnet into the carrier. For holding the opposite ends of the magnet, 16, and for adjusting them toward and from the outer magnets, a thermostatic device is provided which may be in the form of a bi-metallic, curved bar, 18, having one end fastened to the central hub of the carrier and the other end attached to the otherwise free end of the magnet, 16, each of said magnets, 16, being thus provided. In practice, the attachment of the thermostatic bar to the magnet may be rigid, the movement being so slight and in such direction as not to require any pivotal action. The bi-metallic bar has for its inner element a metal having a greater coefficient of expansion than the outer element, so that the effect of increase of temperature is to straighten or enlarge the curve of said bi-metallic bar, thereby causing the end attached to the magnet, 16, to push the latter outward toward the outer magnet. The slight distortion from circular form which this change causes is negligible. A movement of a very few thousandths of an inch being sufficient to effect all the change necessary to compensate for errors due to a change of temperature up to 100° F. In this construction, the outer magnet opposite each gap between the inner magnets affords a path for the flux of the inner magnet and causes it to be largely deflected across the annular gap in which the cup or drag element oscillates so as to be cut by the latter; and similarly the inner magnet opposite each gap between the two outer magnets affords a path for the flux of said outer magnets, causing it to be deflected so as to be cut by the drag element. By the means of employing magnets both inside and outside the depending flange of the drag element, the same advantage of deflecting the flux of each pair so as to be cut by the drag element is obtained as if, instead of the other pair, there were only a magnetic mass, and in addition there is obtained the advantage of the increased magnetic force derived from two pairs of magnets instead of one pair only.

I claim:—

1. In a magnetic speedometer in combination with a magnet carrier mounted for rotation, two sets of magnets mounted thereon for rotation therewith, said sets being spaced apart radially to leave a space of unobstructed clearance between them; a biased drag element mounted for oscillation about the axis of rotation of the magnet carrier in said clearance space; a coöperating graduated scale and pointer, one mounted fixedly and the other carried by the biased drag element, a magnet of one set being mounted so as to have one pole movable toward and from the path of the other set, and a thermostatic device on the carrier connected to such movable pole for so moving it, by change of temperature of the thermostatic device.

2. In a magnetic speedometer in combination with a magnet carrier mounted for rotation, two sets of magnets mounted thereon for rotation therewith, said sets being spaced apart to leave an unobstructed space of clearance between the paths of rotation; a biased drag element mounted for oscillation in said clearance space, one of the magnets of one set being mounted on the carrier for movement of one of its poles relatively to the poles of the other set, and a thermostatic device attached at one end to the carrier and at the other end to said movable magnet, adapted by its expansion and contraction to move the latter upon change of temperature.

3. In a magnetic speedometer in combination with a magnet carrier mounted for rotation, two pairs of magnets mounted thereon, one within the other, the biased drag element mounted for oscillation about the axis of the magnet and intruding into the space between the paths of rotation of the two sets, the magnets of the inner set being movably mounted on the carrier, and a bi-metallic, thermostatic device connecting said movable magnets with the carrier for movement toward and from the axis for movement relatively to the outer magnet by the expansion and contraction of said bi-metallic device.

4. In a magnetic speedometer in combination with a magnet carrier mounted for rotation, two pairs of magnets mounted thereon for rotation therewith, one within the other; a biased drag element mounted for oscillation about the axis of rotation of the magnet carrier in the space between the paths of rotation of the two pairs of magnets, the magnets of the inner pair being pivoted on the carrier for movement toward and from the outer magnets and bi-metallic devices attached at one end to the carrier and at the other end to the pivoted magnets adapted to move the latter toward and from the outer magnets by change of form of said thermostatic device upon change of temperature.

In testimony whereof, I have hereunto set my hand at Chicago, Illinois, this 12th day of August, 1911.

JOHN K. STEWART.

Witnesses:
CHAS. S. BURTON,
EDNA M. MACINTOSH.